No. 642,170. Patented Jan. 30, 1900.
L. S. STARRETT.
SPLIT NUT.
(Application filed Nov. 3, 1897.)

(No Model.)

WITNESSES.
Matthew M. Blunt
Chas. S. Weeks

INVENTOR.
Laroy S. Starrett,
by A. H. Spencer
ATT'Y

UNITED STATES PATENT OFFICE.

LAROY S. STARRETT, OF ATHOL, MASSACHUSETTS.

SPLIT NUT.

SPECIFICATION forming part of Letters Patent No. 642,170, dated January 30, 1900.

Application filed November 3, 1897. Serial No. 657,289. (No model.)

*To all whom it may concern:*

Be it known that I, LAROY S. STARRETT, of Athol, in the county of Worcester and State of Massachusetts, have invented certain new and useful Improvements in Split Nuts, of which the following, taken in connection with the accompanying drawings, is a specification.

The object of this invention is to provide an improved split nut for engaging with and sliding freely upon a threaded stem or rod in various mechanical devices. As herein illustrated, it is applied to and forms part of a pair of calipers or dividers; but it is adapted for numerous uses where it is desired to quickly traverse a threaded shaft with an adjusting-nut engaging and disengaging therewith.

My improved nut comprises two equal internally-threaded members, connected by an annular transversely-elastic washer, which forms a fulcrum and binder near the outer end of the nut, holding said members at the required distance apart and serving as a spring to restore them to engagement with the threads of the stem after being separated therefrom. This washer surrounds the reduced semicylindrical part of said members and is itself inclosed by a thin folded flange formed on the enlarged semicylindrical milled parts which form the head of the nut. The tip of the nut is tapering to enter a tapering aperture, which tends to close the jaws of the nut when the divider-legs are pressed outwardly by the C-shaped spring which connects them. I combine with my invention a cup-shaped sliding collar fitting on the tapering tip of the nut and into the tapering recess in the caliper-leg or other part being adjusted by the nut. This collar, being of hardened steel, protects the tip of the nut from undue wear and rotates with the nut. The nut is reamed out axially in its outer portion to remove the screw-threads from the outermost half of the bore, so that it may slide freely along the threaded stem when such outer portions are pressed together, the inner full-threaded parts being separated by such pressure.

Figure 1:
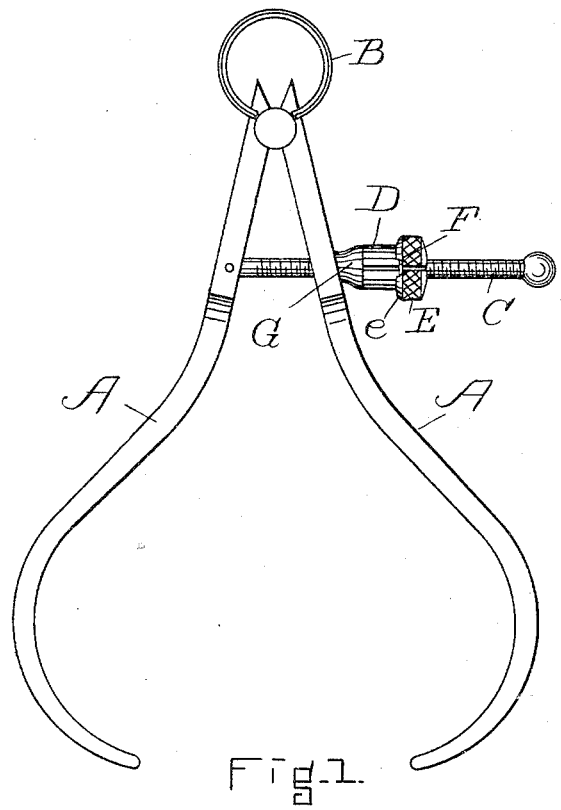
Figures 2, 3:
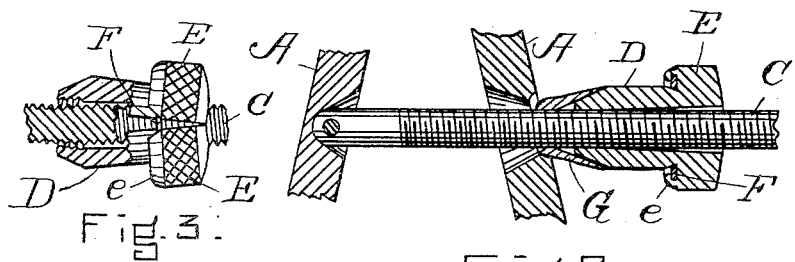
Figure 4:
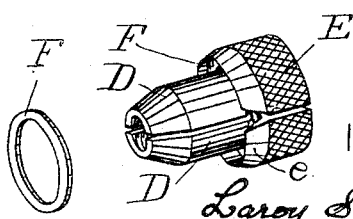

In the drawings, Figure 1 is an elevation of a pair of calipers provided with my improvement. Fig. 2 is an enlarged detail of the threaded stem with the adjacent parts in longitudinal section. Fig. 3 shows, partly in section, the head of the nut compressed to open the threaded jaws. Fig. 4 represents the parts before the flange is turned down over the spring-ring.

A A are the caliper-legs, connected by a hinge and pressed normally outward by the crescent-shaped spring B. C is a transverse threaded stem, pivoted to one of said legs and passed through an elongated recess in the other, so as to give free play to said parts when the instrument is opened and closed. The normal pressure of the spring B tends to spread the legs A. The improved split nut peculiar to my invention is shown mounted on said threaded stem, with which the threads at the inner end of its bore engage. At the outer part of the bore these threads are reamed out and removed. The nut is formed with a reduced cylindrical portion D, having a frusto-conical tip with an enlarged milled head E, having an annular flange *e* extending somewhat over said reduced portion. This nut is perforated axially, then tapped with the proper screw-thread, and afterward split into two equal parts.

F is a thin transversely-elastic washer which fits around the parts D and under the flange *e*, which is then folded down firmly in front of said washer to secure it in place. It will be seen that this washer, although but about the hundredth part of an inch in thickness, serves four very important purposes. It is a hinge to hold the two halves of the nut together, a space-piece to keep them apart, a fulcrum for their opening and closing movement, and a spring to hold their threaded tips engaged with the threads of the stem C.

G is a hardened-steel cap or collar sliding freely on the stem B, fitting over the tapering tip of the nut D, and preferably entering partially into the recess in the leg A. This cap or collar serves to protect from wear the tip of the split nut, since it revolves with the nut. It also transforms the strong outward pressure of the leg A into an inward pressure of the jaws D D upon the threaded stem, such pressures being very effective in keeping said threaded parts engaged. When it is desired to disengage them, so as to slide the nut quickly along the stem in spreading or closing the caliper-legs, such legs are pressed slightly inward to relieve their normal pressure on the nut, which can then be moved freely along the stem C, as explained. The tapering cap G is not broadly new and I claim it only in the combination stated.

A wire ring or close coil may under my improvement be substituted for the washer F and held by the flange e at the same intermediate point.

In Patent No. 351,474, dated October 26, 1886, a modified form of split nut is shown having its members connected by a spring-washer screwed to the head of each and acting to disengage their threaded portions from the screw-stem. Such device lacked the peculiar feature of my invention—the thin flange e, folded over the annular washer to secure it in place without perforation of washer or nut, use of screws, or danger of breakage or loss of parts.

I claim as my invention—

1. The two-part nut described provided with the transversely-elastic annular washer F, secured to and embracing both sections of the nut, and forming a fulcrum, hinge, separator and spring therefor, the head of said nut having a thin integral flange e infolding said washer substantially as set forth.

2. The described split nut formed of two members each having the parts D E e, in combination with the thin, elastic, unperforated annulus F arranged transversely around the part D, between the parts E and e, substantially as set forth.

3. The threaded stem C, the split nut D E e with its members tapered, internally threaded, and reamed to engage with and move freely along said stem, and the transversely-elastic washer F, enfolded by the flange e, in combination with the hardened, sliding cap or collar G having a tapering socket to receive the tip of the nut and close its threads upon the stem, substantially as set forth.

In testimony whereof I have signed my name to this specification, in the presence of two subscribing witnesses, on this 2d day of October, A. D. 1897.

LAROY S. STARRETT.

Witnesses:
FRANK L. TOURTELLOTT,
ANDREW J. HAMILTON.